United States Patent
Ohnheiser

[11] Patent Number: 5,996,239
[45] Date of Patent: Dec. 7, 1999

[54] METHOD OF MAKING COORDINATE MEASUREMENTS OF A WORKPIECE ON A MACHINE TOOL

[75] Inventor: Rainer Ohnheiser, Lauterstein, Germany

[73] Assignee: Carl-Zeiss-Stiftung, Heidenheim, Germany

[21] Appl. No.: 08/796,242

[22] Filed: Feb. 7, 1997

[30] Foreign Application Priority Data

Feb. 7, 1996 [DE] Germany .............................. 196 04 354

[51] Int. Cl.⁶ .............................. G01B 5/008; G01B 7/008
[52] U.S. Cl. .............................................. 33/503; 33/1 M
[58] Field of Search ..................................... 33/503, 1 M

[56] References Cited

U.S. PATENT DOCUMENTS

| | | | |
|---|---|---|---|
| 4,328,623 | 5/1982 | Juengel et al. | 33/504 |
| 4,437,240 | 3/1984 | Juengel et al. | 33/710 |
| 4,581,808 | 4/1986 | Lawaon et al. | 29/558 |
| 4,637,119 | 1/1987 | Schneider et al. | 483/69 |
| 4,653,011 | 3/1987 | Iwano | 395/93 |
| 4,779,319 | 10/1988 | Juengel | 29/57 |
| 4,977,512 | 12/1990 | Nakagawa | 364/474.37 |
| 5,040,306 | 8/1991 | McMurtry et al. | 33/556 |
| 5,097,632 | 3/1992 | Yamamori et al. | 451/5 |
| 5,150,529 | 9/1992 | Collingwood | 33/503 |
| 5,257,460 | 11/1993 | McMurtry | 33/502 |
| 5,387,061 | 2/1995 | Barkman et al. | 409/80 |
| 5,396,712 | 3/1995 | Herzog | 33/503 |
| 5,439,431 | 8/1995 | Hessbrüggen et al. | 483/14 |

FOREIGN PATENT DOCUMENTS

| | | |
|---|---|---|
| 0356513 | 9/1988 | European Pat. Off. . |
| 60071118 | 4/1985 | Japan . |
| 213712 | 9/1986 | Japan . |
| 213713 | 9/1986 | Japan . |
| 135309 | 5/1974 | United Kingdom . |
| 2154163 | 9/1985 | United Kingdom . |

Primary Examiner—Diego Gutierrez
Assistant Examiner—R A Smith
Attorney, Agent, or Firm—Walter Ottesen

[57] ABSTRACT

The invention is directed to a method for making coordinate measurements on a workpiece on a machine tool. In this method, the workpiece 25 remains on the machine tool during the measuring operation and is scanned via a measuring arm of a coordinate measuring apparatus 31 set up next to the machine tool 21. The coordinate measuring apparatus 31 has its own measuring system for detecting the movements of the measurement arm 34 or of the probe 35 attached to the measuring arm. It is not absolutely necessary that the coordinate measuring apparatus 21 have its own drives or that it has its own CNC-control because the measurement arm or the probe head can be guided or moved with the aid of an entrainment device 27 by the drives of the machine tool 21.

26 Claims, 3 Drawing Sheets

METHOD OF MAKING COORDINATE MEASUREMENTS OF A WORKPIECE ON A MACHINE TOOL

FIELD OF THE INVENTION

The invention relates to method for making coordinate measurements on a workpiece on a machine tool wherein the workpiece remains on the machine tool during the measuring operation. The invention also relates to a combined machining and measuring center for carrying out the method of the invention.

BACKGROUND OF THE INVENTION

It is already known to make coordinate measurements of a workpiece on the machine utilized for machining the workpiece without reclamping the latter. For this purpose, the procedure has been that a probe head is seated in the worktool holder of the machine in lieu of the machining worktool. This worktool holder is in the form of a Morse cone. In the subsequent measuring operation, the machining tool travels to the points of the workpiece to be measured and at contact the disengageably mounted probe transmits a wireless probe signal to the control of the machine. The signal serves to retain the position of the machine slide at the time point of contact. A method of this kind is disclosed, for example, in U.S. Pat. Nos. 4,328,623; 4,437,240; and, 4,779,319.

Various measurements can be carried out in the manner described. Thus, the surface of a sample workpiece can be digitized on the machine tool which thereafter produces copies of this workpiece based on this data. Often, the measurement on the machine tool however serves only to determine the so-called zero point offset with the purpose of bringing the machine coordinate system into correspondence with the coordinate system of the workpiece which can already have been partially machined. In addition, individual geometric elements can be measured such as the diameter or spacing of bores directly after these bores have been made.

In the manner described, no especially precise measurements can however be carried out. This is so for several reasons. On the one hand, the measurement uncertainty is dependent upon the measuring systems utilized for positioning the slides of the machine. These measuring systems, as a rule, do not belong to the same class of precision as the measuring systems utilized in special coordinate measuring apparatus. On the other hand, the guidance of the machining worktool or the measuring worktool in the machine tool does not take place on ideal lines of a Cartesian coordinate system. Rather, guide errors must be expected as well as bending of the machine assembly because of the shifting masses, which occur when the slides are displaced, and because of reaction forces when driving to the workpiece and when braking, et cetera. For these reasons, more demanding measuring tasks (for which a higher accuracy is required) are performed, as before, on special coordinate measuring apparatus. The workpiece to be measured must then be transported to the coordinate measuring apparatus and clamped into position anew. If several measuring operations must be carried out between individual machining operations then the unclamping and reclamping of the workpiece between the machining phase and measuring phase is very time consuming.

In addition, a separate coordinate measuring apparatus is also relatively expensive when the latter is equipped with its own CNC-control and drives in all axes. The suggestion has already been made to eliminate the drives of the coordinate measuring apparatus and to position the probe head or the measuring arm of the coordinate measuring apparatus with the aid of a simple robot as disclosed, for example, in U.S. Pat. No. 4,653,011. In this way, the problem described above of reclamping the workpiece is however not solved.

SUMMARY OF THE INVENTION

It is an object of the invention to make coordinate measurements with the highest accuracy on a workpiece mounted in the machine tool.

The method of the invention is for making coordinate measurements of a workpiece on a machine tool with a coordinate measuring apparatus set up next to or on the machine tool. The apparatus has a measuring arm for holding a probe unit and a measurement system. The method includes the steps of: keeping the workpiece on the machine tool while making the coordinate measurements; moving the measuring arm to permit contact scanning the workpiece with the probe element of the probe unit; and, detecting the movements of the probe element utilizing the measurement system of the apparatus.

The invention permits the workpiece to remain on the machine tool even while making the precise coordinate measurements. A reclamping between machining and measuring is therefore not required. Furthermore, highly precise measuring results are obtained because it is not the guides and measuring system of the machine tool which are utilized for measuring purposes; instead, the guides and measuring system of a coordinate measuring apparatus are used for the measuring operation. This coordinate measuring apparatus is constructed and especially designed for measuring purposes.

The coordinate measuring apparatus is advantageously arranged next to or on the machine tool so that the measuring arm of the coordinate measuring apparatus can at least partially move into the machining space of the machine tool. Here, and to provide better accessibility during the machining phase, it can be advantageous when the coordinate measuring apparatus, as a whole, or parts of the coordinate measuring apparatus are moveable in a direction toward the machining space of the machine tool for the measuring operation. For example, the apparatus or parts thereof can be displaceable or pivotable in such a manner that the measuring region of the measuring arm of the coordinate measuring apparatus moves into the machining space of the machine tool after displacement or pivoting. During the actual machining phase, when cutting worktools are in place, the measuring apparatus is withdrawn or pivoted to the edge of the machining space in order not to hinder the manufacturing operation.

The coordinate measuring apparatus can be a manual apparatus having measuring slides moved by an operator, or the apparatus can be a CNC-controlled apparatus having its own motorized drives. However, it is not absolutely necessary to utilize a fully motorized CNC-controlled coordinate measuring apparatus for making an automatic measurement of the workpiece on the machine tool, rather, and in an especially advantageous embodiment, the measuring arm of the coordinate measuring apparatus is moved by the drives of the machine tool; whereas, the position of the probe attached to the measuring arm is detected by the measuring systems of the coordinate measuring apparatus. For this purpose, the probe head or the measuring arm of the coordinate measuring apparatus is coupled to a moveable part of the machine tool such as to the spindle which can be positioned in all three spatial directions. Coupling, for example, is performed with a mechanical, magnetic or pneumatic clamp and the probe head of a "manual" coordinate measuring apparatus can then be positioned in the machining space. The coordinate measuring apparatus can otherwise be a manually guided one.

Coordinate measuring apparatus of different configurations can be combined with the machine tool to form a measuring center depending upon the machine tool used. When the machine tool guides the measuring arm of the coordinate measuring apparatus, a coordinate measuring apparatus is utilized having a measuring arm which can be easily displaced in the three spatial directions and which can be moved easily into the machining space. For this purpose, coordinate measuring apparatus of a stationary type having a horizontally guided measuring arm or apparatus of the articulated-arm type are especially suited, as disclosed, for example, in U.S. Pat. No. 5,396,712.

BRIEF DESCRIPTION OF THE DRAWINGS

The invention will now be described with reference to the drawings wherein.

DESCRIPTION OF THE PREFERRED EMBODIMENTS

Figure 1:
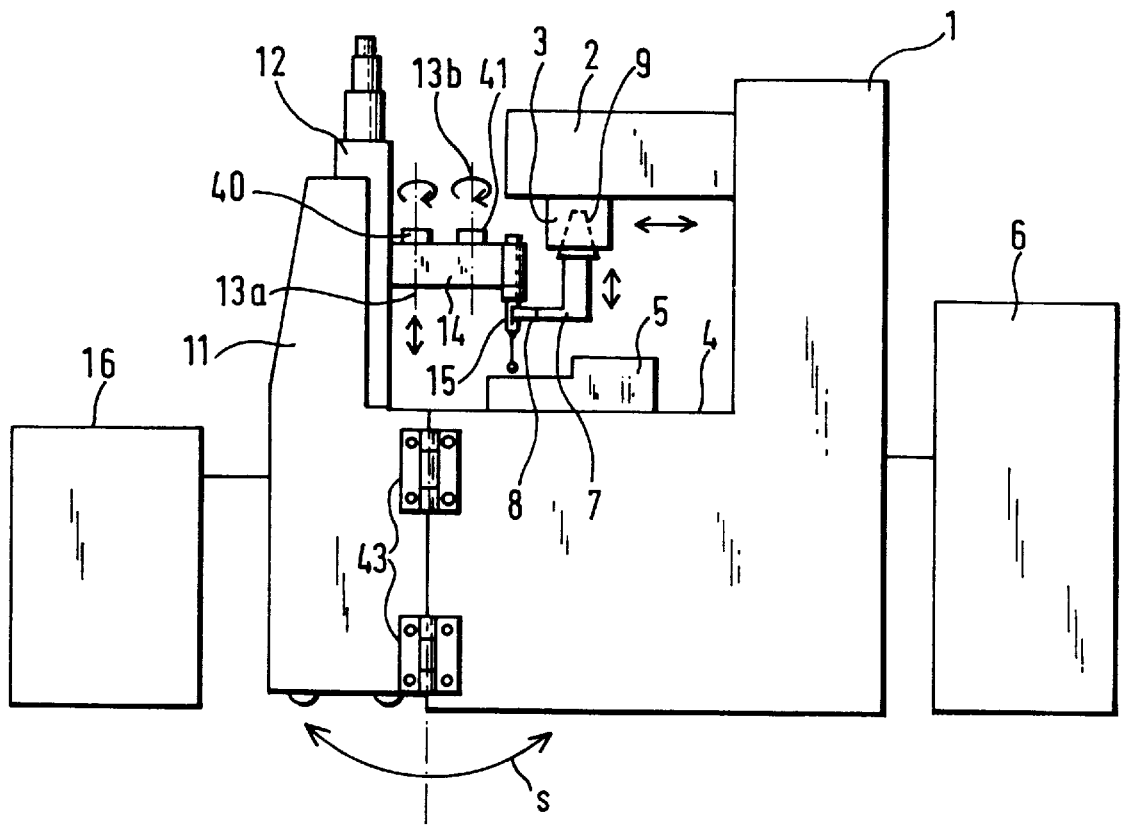
FIG. 1 is a schematic showing a first embodiment of the invention of a combined machining and measuring center for workpieces.

The combined machining and measuring center shown in FIG. 1 comprises a machine tool 1 as well as a coordinate measuring apparatus 11 which are connected to each other via a pivot mechanism 43. During the machining phase (not shown), the coordinate measuring apparatus 11 is pivoted out of the position shown by about 180° and set up next to the machine tool 1 and thereby does not hinder the accessibility to the machining space during machining (for example, cutting) of the workpiece 5. The coordinate measuring apparatus 11 is pivoted into the position shown only for the actual measuring operation and is there secured to the machine tool 1 in order to establish a clear stable reference between the machine tool and the coordinate measuring apparatus.

The machine tool 1 includes a spindle which can be positioned in all three spatial directions via the two slides 2 and 3. The spindle has a holder in which worktools are normally seated for machining the workpiece 5 clamped to the table 4. Reference numeral 6 identifies the CNC-control of the machine tool 1.

The coordinate measuring apparatus 11 is of the so-called articulated arm type as described, for example, in U.S. Pat. No. 5,396,712 incorporated herein by reference. The apparatus has a measuring arm 14 which can be moved vertically along a guide 12 via a tracking control. The measuring arm 14 is configured as an articulated arm and can include a plurality of sensors such as encoders (40,41). This articulated arm 14 has two parallel joint shafts (13a, 13b) via which the measuring arm 14 can be folded. The rotational angle of the joints is detected via the two encoders (40, 41) which are mounted to correspond to the joint shafts (13a, 13b), respectively. The measuring arm 14 of the coordinate measuring apparatus has an electronic measuring probe head 15 at its end facing toward the machine tool 1. The probe head 15 has a probe ball with which the surface of the workpiece can be contacted.

Reference numeral 16 identifies the evaluation unit of the coordinate measuring apparatus, that is, the electronics including the computer of the apparatus.

Figure 1A:
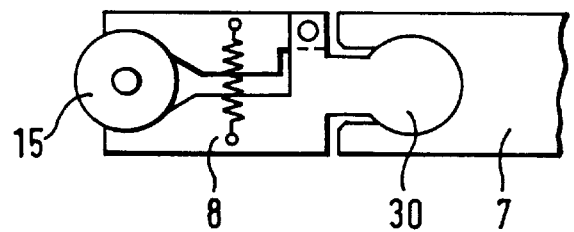
FIG. 1a is a schematic plan view of an angled connecting unit for connecting the probe head to the worktool spindle of the machine tool.

The probe head 15 of the coordinate measuring apparatus is guided on the path provided for the measuring program via the drives present in the machine tool 1. For this purpose, a device is exchanged into the worktool holder in lieu of the machining worktool. This device couples or connects the probe head 15 to the worktool spindle. This device can, for example, comprise a Morse cone 9 as well as an angled connecting piece 7. A spring clamp 8 is mounted at the end of the connecting piece 7 and releasably holds the cylindrical part of the probe head 15 as shown in detail in FIG. 1a. The actual clamp 8 is decoupled from arm 7a of connecting piece 7 with respect to tilt movements via a ball joint in order to prevent constraining forces between the arm and the probe head 15.

The connecting device (7, 8, 9) operates as an entraining device and can, for example, be engaged in and disengaged automatically above the worktool magazine (not shown) of the machine tool 1.

Figure 2:
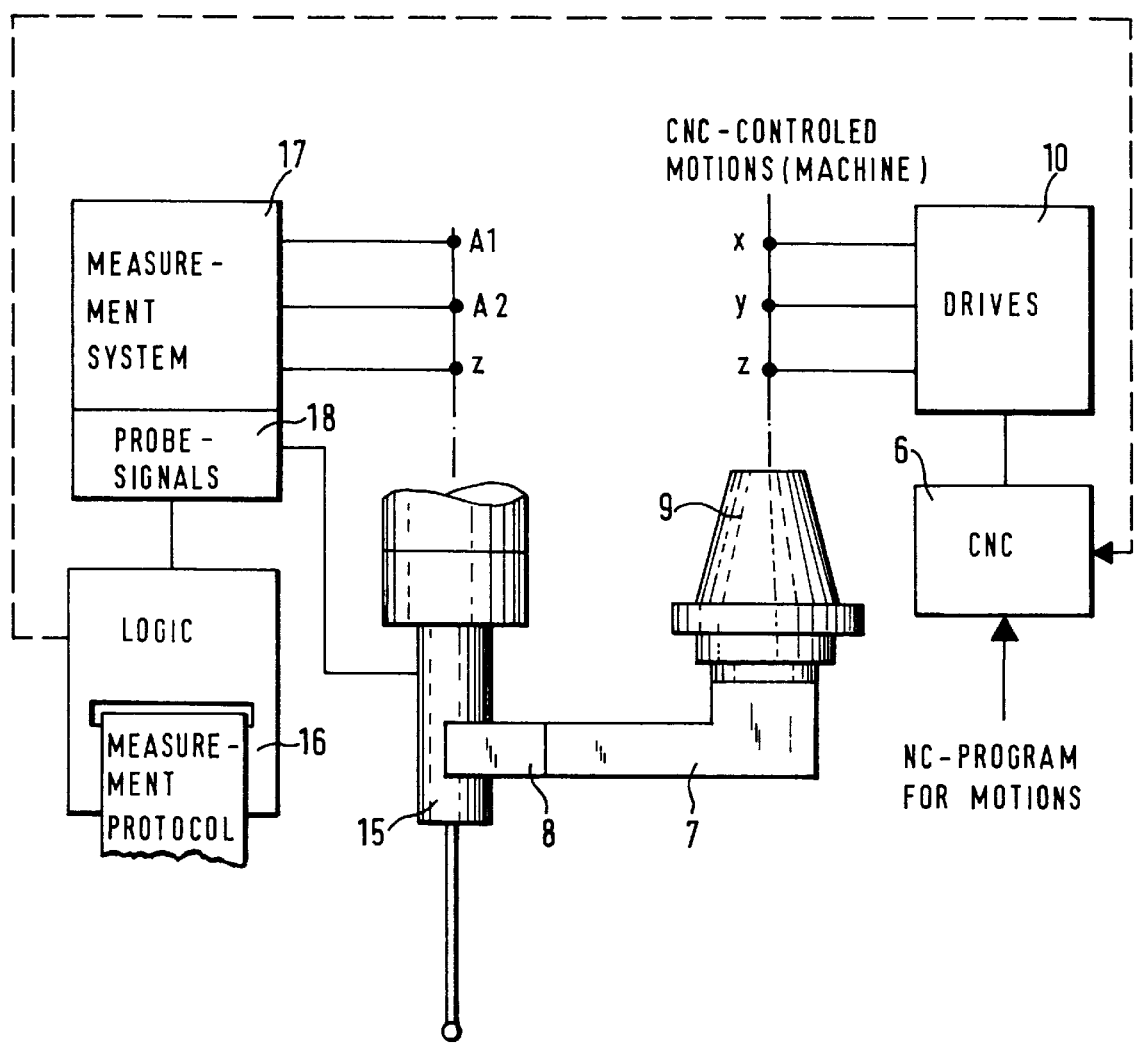
FIG. 2 is a block circuit diagram showing the positioning of the probe head of the combined machining and measuring center of FIG. 1 with the aid of the drives of the machine tool; and, FIG. 3 is a schematic showing a second embodiment of the combined machining and measuring center according to the invention.

As shown in the block circuit diagram of FIG. 2, the probe head 15 of the coordinate measuring apparatus 11 can be positioned via the entraining device. This positioning is achieved with the CNC-control of the drives 10 of the machine tool in the context of the measuring program provided for this purpose. However, the precise coordinate measuring values are generated by the coordinate measuring apparatus 11 because the position of the probe head 15 is determined by the measuring system 17 of the coordinate measuring apparatus. In the present case, the angle positions A1 and A2 of the joint shafts (13a, 13b) of the measuring arm 14 and the Z coordinate of the measuring arm 14 at that time point, at which the contact signal is generated in the probe head 15, are transmitted to the evaluation unit 16 of the coordinate measuring apparatus where the measurement protocol is set up. Furthermore, the measuring results can be fed back into the CNC-control of the machine tool 1 as indicated by the broken line, for example, in order to bring the workpiece coordinate system into correspondence with the machine coordinate system of the machine tool 1.

Figure 3:
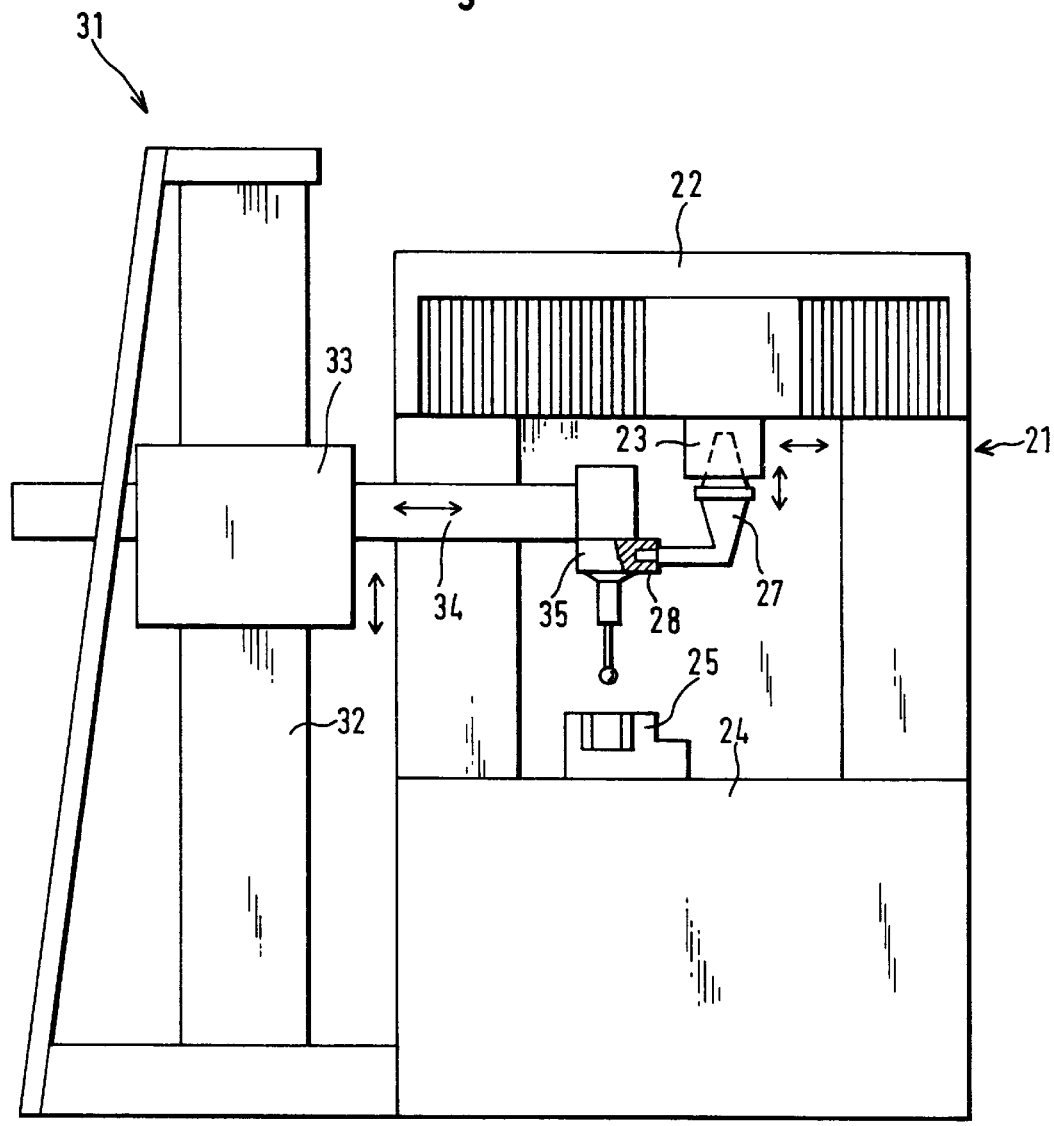

In the embodiment of FIG. 3, the machine tool is identified by reference numeral 21 and is shown in a position rotated by 90° compared to FIG. 1. Otherwise, the same parts shown here have the same reference numeral as corresponding parts in FIG. 1 but with each reference numeral increased by 20.

In this case, the machine tool 21 is combined with a coordinate measuring apparatus of the stationary type wherein a measuring arm 34 is journalled in a compound slide 33 displaceable in elevation. The measuring arm 34 is displaceable in the horizontal X coordinate. The vertical guide column 32 is, in turn, perpendicular to the plane of the drawing and is journalled on a displaceable base plate (not shown). Photoelectrically scannable grating scales are assigned to all measurement slides. With these grating scales, the position of the probe head 35, which is attached to the measuring arm 34, can be detected with high accuracy.

In this embodiment also, the probe head 35 is connected to the worktool holder in the spindle of the machine tool 21 via an entraining device 27. In this way, the probe head 35 can be positioned in correspondence to the selected measuring program by the drives of the machine tool 21 in the machining space of the machine tool for the purpose of measuring the workpiece 25 clamped to the table 24 of the machine tool. An electromagnetic coupling or holding device 28 is provided for coupling the entraining device 27 to the probe head 35. The coupling or holding device 28 is shown, for example, in U.S. Pat. No. 4,637,119 for holding exchangeable probe pins. This holding arrangement permits the holding force of a permanent magnet to be switched on and off via a pole-reversible excitable electromagnet. The switching action is machine controlled.

In this way, the following operation can be realized. During a machining operation, the measuring arm 34 of the coordinate measuring apparatus 31 is completely pushed out of the machining space of the machine tool 21 so that the coordinate measuring apparatus 31 does not disturb machining of the workpiece 25. The coordinate measuring apparatus 31 is set up next to the machine tool 21. For the measuring operation which then follows, the entraining device 27 is either exchanged manually or automatically from the worktool magazine of the machine tool 21.

Thereafter, the worktool spindle 23 is moved to the edge of the machining space in the direction toward the probe head 35 and the entraining device 27 with the holding device 28 is magnetically coupled to the probe head 35 via a corresponding control pulse. Thereafter, the spindle 23 travels back to the workpiece 25 and pulls the measurement arm 34 of the coordinate measuring apparatus 31 and the probe head 35 along. Simultaneously, the position of the probe head 35 is detected with high precision by the measuring system assigned to the slides (32 to 34) of the coordinate measuring apparatus 31.

The probe head 35 can either be a switching probe head or a so-called measuring probe head with which the contours of the surfaces of the workpiece can be scanned with continuous contact between the probe ball and workpiece surface.

Furthermore, it is also possible to mount a contactless sensor on the measurement arm 34 of the coordinate measuring apparatus in lieu of a mechanically contacting probe head. The contactless sensor can be an optical sensor such as a triangulation probe or a video camera.

Likewise, in some instances, it can be advantageous not to mount the probe head 35 directly on the measuring arm but, instead, to mount the probe head 35 indirectly via an extension on the measuring arm 34 in order to shift the measuring region of the coordinate measuring apparatus further in the direction toward the machining space of the machine tool 21.

Furthermore, the coordinate measuring apparatus must not be permanently fixed to the machine tool. Rather, it can be brought to the machine tool for individual measuring operations and there be coupled to the machine tool, for example, via a reproducible docking location. Such a docking location can, for example, comprise three conical receptacles on the machine tool in which the three balls engage which are attached to the coordinate measuring apparatus. In this way, it is also possible to use the coordinate measuring apparatus many times in that several machine tools are provided with such a docking location at which the coordinate measuring apparatus can then be mounted in each case as required. Also, in these cases, the workpiece can remain clamped on the machine tool for the operation of the coordinate measurement.

Finally, the measurement arm of the coordinate measuring apparatus must also not necessarily be moved by the machine tool. The workpiece can even remain on the machine tool when the coordinate measuring apparatus is itself CNC-controlled and the measurements are carried out under its own power or, when the coordinate measuring apparatus is a manually operated apparatus having measurement slides moved by the operator.

It is understood that the foregoing description is that of the preferred embodiments of the invention and that various changes and modifications may be made thereto without departing from the spirit and scope of the invention as defined in the appended claims.

What is claimed is:

1. A method for making coordinate measurements of a workpiece on a machine tool with a coordinate measuring apparatus set up next to or on the machine tool, the apparatus having a measuring arm for holding a probe unit having a probe element and said apparatus having a measurement system including a plurality of sensors, the method comprising the steps of:

keeping the workpiece on the machine tool while mating the coordinate measurements;

moving said measuring arm to permit contact scanning the workpiece with the probe element of said probe unit;

utilizing said plurality of sensors for detecting the movements of said probe element and utilizing said measurement system of said coordinate measuring apparatus for making the coordinate measurement of said workpiece; and, said machine tool having a measurement system and said measurement system of said coordinate measuring apparatus being separate from said measurement system of said machine tool.

2. The method of claim 1, wherein the machine tool defines a machining space, the method comprising the further step of moving said measuring arm into the machining space of said machine tool.

3. The method of claim 2, wherein said machine tool has drives to move a worktool into said machining space; the method comprises the further step of moving said measuring arm via said drives; and, detecting the position of said probe unit with the measurement system of said coordinate measuring apparatus.

4. The method of claim 3, wherein said machine tool has a movable part; and, wherein the method comprises the further step of coupling said measuring arm or said probe unit to said movable part.

5. The method of claim 4, wherein said machine tool has a control; and, wherein the method comprises the further step of feeding said coordinate measurement to said control of said machine tool.

6. The method of claim 1, comprising the further step of moving said coordinate measuring apparatus in the direction of the machining space of said machine tool for the coordinate measurement.

7. The method of claim 1, wherein said measurement system of said machine tool has a predetermined measuring accuracy and said measurement system of said coordinate measuring apparatus having a measuring accuracy greater than said measuring accuracy of said measurement system of said machine tool.

8. A combined machining and measuring center for a workpiece, the center comprising:

a machine tool wherein the workpiece remains mounted thereon during a measuring operation thereof;

a coordinate measuring apparatus mounted next to or on said machine tool;

said apparatus having a movable measuring arm and a probe unit attached to said measuring arm;

said coordinate measuring apparatus having its own measuring system including a plurality of sensors for detecting the movements of said probe unit attached to said movable measuring arm to facilitate a coordinate measurement of said workpiece by said measuring system; and said machine tool having a measurement system and said measuring system of said coordinate measuring apparatus being separate from said measurement system of said machine tool.

9. The center of claim 8, said machine tool having a movable part and said center further comprising a coupling device for coupling one of said measuring arm and said probe unit to said movable part.

10. The center of claim 9, said coupling device including an electromechanical, a magnetic or a pneumatic coupling which can be machine-control activated or manually activated.

11. The center of claim 8, wherein said coordinate measuring apparatus and said machine tool conjointly define a docking interface to permit said measuring arm to move into the machining space of said machine tool after said apparatus has been docked on said machine tool.

12. The center of claim 8, said measuring arm being an articulated arm having a plurality of articulated joints so as to permit said probe unit to be freely displaceable in at least two coordinates.

13. The center of claim 8, wherein said coordinate measuring apparatus is a stationary apparatus; said measuring arm being a horizontally displaceable measuring arm; and, said probe unit being attached to said measuring arm so as to be displaceable therewith.

14. The center of claim 8, said measuring arm being an articulated arm having a plurality of articulated joints so as to permit said probe unit to be freely displaceable in at least two coordinates.

15. The center of claim 8, wherein said measurement system of said machine tool has a predetermined measuring accuracy and said measuring system of said coordinate measuring apparatus having a measuring accuracy greater than said measuring accuracy of said measurement system of said machine tool.

16. A method for making coordinate measurements of a workpiece on a machine tool with a coordinate measuring apparatus set up next to or on the machine tool, the apparatus having a measuring arm for holding a probe unit having a probe element and the apparatus having a measurement system and the machine tool having drives to move a movable part, the method comprising the steps of:

keeping the workpiece on the machine tool while making the coordinate measurements;

coupling one of said measuring arm and said probe unit to said movable part;

moving said measuring arm via the drives of the machine tool to permit contact scanning of the workpiece with the probe element of said probe unit;

detecting the movements of said probe element for making the coordinate measurement utilizing said measurement system of said coordinate measuring apparatus; and, said machine tool having a measurement system and said measurement system of said coordinate measuring apparatus being separate from said measurement system of said machine tool.

17. The method of claim 16, wherein the machine tool defines a machine space, the method comprising the further step of moving said measuring arm into the machining space of said machine tool.

18. The method of claim 17, wherein the drives of said machine tool moves a worktool into said machining space; the method comprises the further step of moving said measuring arm via said drives; and, detecting the position of said probe unit with the measurement system of said coordinate measuring apparatus.

19. The method of claim 18, wherein said machine tool has a control; and, wherein the method comprises the further step of feeding the obtained results of the coordinate measurement to said control of said machine tool.

20. The method of claim 16, comprising the further step of moving said coordinate measuring apparatus in the direction of the machining space of said machine tool for the coordinate measurement.

21. The method of claim 16, wherein said measurement system of said machine tool has a predetermined measuring accuracy and said measurement system of said coordinate measuring apparatus having a measuring accuracy greater than said measuring accuracy of said measurement system of said machine tool.

22. A combined machining and measuring center for a workpiece, the center comprising:

a machine tool wherein the workpiece remains mounted on the machine tool during a measuring operation thereof;

said machine tool having a movable part and drives to move said movable part, a coordinate measuring apparatus mounted next to or on said machine tool;

said apparatus having a movable measuring arm and a probe unit attached to said measuring arm;

said coordinate measuring apparatus having its own measurement system for detecting the position of said probe attached to said movable measuring arm and for making coordinate measurements of said workpiece;

a coupling device for coupling one of said measuring arm and said probe unit to said movable part so as to permit said drives to said machine tool to move said measuring arm to facilitate making said coordinate measurements of said workpiece by utilizing said measurement system of said coordinate measuring apparatus; and, said machine tool having a measurement system and said measurement system of said coordinate measuring apparatus being separate from said measurement system of said machine tool.

23. The center of claim 22, said coupling device including an electromechanical, a magnetic or a pneumatic coupling which can be machine-control activated or manually activated.

24. The center of claim 22, wherein said coordinate measuring apparatus and said machine tool conjointly define a docking interface to permit said measuring arm to move into the machining space of said machine tool after said apparatus has been docked next to or on said machine tool.

25. The center of claim 22, wherein said coordinate measuring apparatus is a stationary apparatus; said measuring arm being a horizontally displaceable measuring arm; and, said probe unit being attached to said measuring arm so as to be displaceable therewith.

26. The center of claim 22, wherein said measurement system of said machine tool has a predetermined measuring accuracy and said measurement system of said coordinate measuring apparatus having a measuring accuracy greater than said measuring accuracy of said measurement system of said machine tool.

* * * * *

UNITED STATES PATENT AND TRADEMARK OFFICE
CERTIFICATE OF CORRECTION

PATENT NO. : 5,996,239
DATED : December 7, 1999
INVENTOR(S) : Rainer Ohnheiser

It is certified that error appears in the above-identified patent and that said Letters Patent is hereby corrected as shown below:

Title page,

Under "U.S. PATENT DOCUMENTS",
Line 3, delete "Lawaon et al" and substitute -- Lawson et al -- therefor.

Under "FOREIGN PATENT DOCUMENTS",
Line 5, delete "135309" and substitute -- 1353039 -- therefor.

Column 3,
Line 39, delete "EMBODIMENTS" and substitute -- EMBODIMENTS OF THE INVENTION -- therefor.
Line 46, delete "1800" and substitute -- 180° -- therefor.

Column 6,
Line 24, delete "mating" and substitute -- making -- therefor.

Column 7,
Line 12, delete "and" substitute -- and, -- therefor.

Column 8,
Line 34, delete "part," and substitute -- part; -- therefor.
Line 46, delete "to" and substitute -- of -- therefor.

Signed and Sealed this

Thirtieth Day of October, 2001

Attest:

*Attesting Officer*

NICHOLAS P. GODICI
*Acting Director of the United States Patent and Trademark Office*